US012649453B2

(12) United States Patent (10) Patent No.: US 12,649,453 B2
Robertson et al. (45) Date of Patent: Jun. 9, 2026

(54) BRAKE MASS PARAMETER

(71) Applicant: Airbus Operations Limited, Bristol (GB)

(72) Inventors: Michael Robertson, Bristol (GB); Michael Race, Bristol (GB)

(73) Assignee: Airbus Operations Limited, Bristol (GB)

( * ) Notice: Subject to any disclaimer, the term of this patent is extended or adjusted under 35 U.S.C. 154(b) by 613 days.

(21) Appl. No.: 17/215,530

(22) Filed: Mar. 29, 2021

(65) Prior Publication Data

US 2021/0300313 A1 Sep. 30, 2021

(30) Foreign Application Priority Data

Mar. 30, 2020 (GB) ...................................... 2004640

(51) Int. Cl.
B60T 17/22 (2006.01)
B64F 5/60 (2017.01)
F16D 66/00 (2006.01)
(52) U.S. Cl.
CPC .............. B60T 17/221 (2013.01); B64F 5/60 (2017.01); F16D 66/00 (2013.01); B60T 2270/406 (2013.01); F16D 2066/001 (2013.01); F16D 2066/006 (2013.01)
(58) Field of Classification Search
CPC ....................................................... B64F 5/60
See application file for complete search history.

(56) References Cited

U.S. PATENT DOCUMENTS

| | | | |
|---|---|---|---|
| 2006/0220449 A1 | 10/2006 | Svensson | |
| 2008/0033607 A1 | 2/2008 | Zeliff et al. | |
| 2014/0163815 A1 | 6/2014 | Cahill et al. | |
| 2015/0286215 A1 | 10/2015 | Alvarado, Jr. et al. | |
| 2017/0305577 A1* | 10/2017 | Bill ......................... | B60T 17/22 |
| 2018/0208300 A1* | 7/2018 | Bill ......................... | B60T 17/22 |
| 2018/0290639 A1* | 10/2018 | Dirgo ...................... | B60T 17/22 |
| 2019/0263374 A1 | 8/2019 | Bill et al. | |
| 2019/0263375 A1 | 8/2019 | Oza et al. | |
| 2019/0263510 A1 | 8/2019 | Bill et al. | |

(Continued)

FOREIGN PATENT DOCUMENTS

| | | |
|---|---|---|
| CN | 110905951 | 3/2020 |
| EP | 1 307 375 | 1/2010 |

(Continued)

OTHER PUBLICATIONS

Combined Search and Exam Report for GB2004640.5, dated Sep. 14, 2020, 7 pages.

(Continued)

*Primary Examiner* — Imran K Mustafa
(74) *Attorney, Agent, or Firm* — Nixon & Vanderhye P.C.

(57) ABSTRACT
A method to and an apparatus including a processor configured to determine a mass parameter indicative of a mass of an aircraft brake assembly, the mass parameter determined using an estimated amount of energy absorbed by the brake assembly in a given period of time and a corresponding estimated change in temperature of the brake assembly. Also disclosed is a non-transitory computer readable storage medium having stored thereon instructions which when executed by a processor, cause the processor to perform the method.

20 Claims, 8 Drawing Sheets

402 Determine a mass parameter indicative of a mass of an aircraft brake assembly, the mass parameter determined using an estimated amount of energy absorbed by the brake assembly in a given period of time and a corresponding estimated change in temperature of the brake assembly

(56) References Cited

U.S. PATENT DOCUMENTS

| 2019/0283728 | A1 | 9/2019 | Jimenez et al. |
| 2019/0329910 | A1 | 10/2019 | Bill |
| 2021/0237907 | A1* | 8/2021 | Franzini ................. B64D 43/00 |

FOREIGN PATENT DOCUMENTS

| EP | 3 072 763 | 9/2016 |
| GB | 2571375 | 2/2019 |
| GB | 2571359 | 8/2019 |
| GB | 2571397 | 8/2019 |

OTHER PUBLICATIONS

European Search Report cited in EP 21165559.2 mailed Sep. 10, 2021, five pages.

* cited by examiner

400

402

Determine a mass parameter indicative of a mass of an aircraft brake assembly, the mass parameter determined using an estimated amount of energy absorbed by the brake assembly in a given period of time and a corresponding estimated change in temperature of the brake assembly

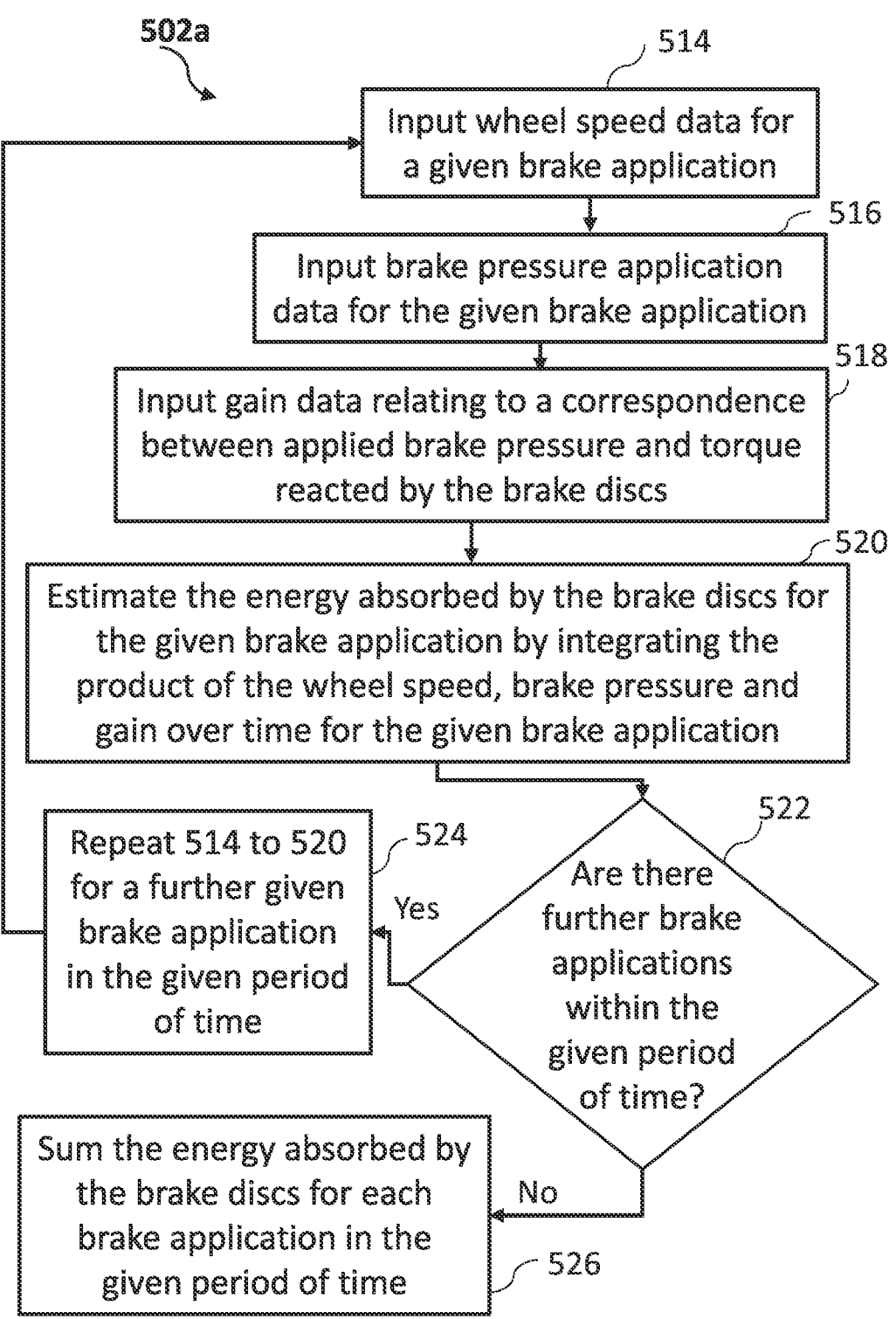

502a

514

Input wheel speed data for a given brake application

516

Input brake pressure application data for the given brake application

518

Input gain data relating to a correspondence between applied brake pressure and torque reacted by the brake discs

520

Estimate the energy absorbed by the brake discs for the given brake application by integrating the product of the wheel speed, brake pressure and gain over time for the given brake application

524

Repeat 514 to 520 for a further given brake application in the given period of time

522

Are there further brake applications within the given period of time?

Yes

No

526

Sum the energy absorbed by the brake discs for each brake application in the given period of time

Figure 5b

BRAKE MASS PARAMETER

RELATED APPLICATION

This application claims priority to United Kingdom Patent Application GB2004640.5 filed Mar. 30, 2020, the entirety of which is incorporated by reference.

TECHNICAL FIELD

The present invention relates to a mass parameter relating to a brake assembly.

BACKGROUND

Vehicle brakes may include component such as brake discs composed of Carbon-Carbon composites. The mass of the brake discs may decrease with use due to wear and/or oxidation. The brake may need to be serviced or replaced once a certain amount of mass is lost.

SUMMARY

A first aspect of the present invention provides an apparatus comprising a processor configured to determine a mass parameter indicative of a mass of an aircraft brake assembly, the mass parameter determined using an estimated amount of energy absorbed by the brake assembly in a given period of time and a corresponding estimated change in temperature of the brake assembly.

Optionally, the processor is configured to determine the mass parameter by dividing the estimated amount of energy by the corresponding estimated change in temperature.

Optionally, the processor is configured to determine a trend in the mass parameter of the brake assembly over time using a plurality of determined mass parameters corresponding to different points in time.

Optionally, the processor is configured to predict a number of good future use cycles of the brake assembly based on the determined trend.

Optionally, the processor is configured to predict a condition of the brake assembly based on the determined trend.

Optionally, the processor is configured to estimate the amount of energy absorbed by the brake assembly based on wheel speed data for the given period of time, brake pressure application data for the given period of time and gain data relating to a correspondence between applied brake pressure and torque reacted by the brake assembly.

Optionally, the processor is configured to estimate the amount of energy absorbed by the brake assembly based on wheel speed data for the given period of time and brake torque data for the given period of time.

Optionally, the estimated change in temperature corresponding to the estimated amount of energy absorbed by the brake assembly is estimated based on a time delay between energy being absorbed by the brake assembly and a corresponding change in temperature at a temperature measurement location.

Optionally, the estimated change in temperature corresponding to the estimated amount of energy absorbed by the brake assembly is estimated based on operational information relating to a brake cooling apparatus.

According to a second aspect of the present invention, there is provided and aircraft comprising the apparatus according to the first aspect.

According to a third aspect of the present invention, there is provided a method comprising determining a mass parameter indicative of a mass of an aircraft brake assembly, the mass parameter determined using an estimated amount of energy absorbed by the brake assembly in a given period of time and a corresponding estimated change in temperature of the brake assembly.

Optionally, the method according to the third aspect comprises determining the mass parameter by dividing the estimated amount of energy by the corresponding estimated change in temperature.

Optionally, the method according to the third aspect comprises determining a trend in the mass parameter of the brake assembly over time using a plurality of determined mass parameters corresponding to different points in time.

Optionally, the method according to the third aspect comprises determining a condition of the brake assembly based on the determined trend.

Optionally, the method according to the third aspect comprises either: estimating the amount of energy absorbed by the brake assembly based on wheel speed data for the given period of time, brake pressure application data for the given period of time and gain data relating to a correspondence between applied brake pressure and torque reacted by the brake assembly; or estimating the amount of energy absorbed by the brake assembly based on wheel speed data for the given period of time and brake torque data for the given period of time.

Optionally, the method according to the third aspect comprises: estimating the estimated change in temperature corresponding to the estimated amount of energy absorbed by the brake assembly based on a time delay between energy being absorbed by the brake assembly and a corresponding change in temperature at a temperature measurement location; and/or estimating the estimated change in temperature corresponding to the estimated amount of energy absorbed by the brake assembly based on operational information relating to a brake cooling apparatus.

According to a fourth aspect of the present invention, there is provided a non-transitory computer readable storage medium having stored thereon instructions which when executed by a processor, cause the processor to perform the method according to the third aspect.

BRIEF DESCRIPTION OF THE DRAWINGS

Embodiments of the invention will now be described, by way of example only, with reference to the accompanying drawings, in which:

FIG. 5*b* is a flow diagram of a method of estimating the energy absorbed by a brake assembly, according to an example;

DETAILED DESCRIPTION

The following disclosure relates to apparatus and methods relating to determining a mass parameter in relation to an aircraft brake assembly.

Figure 1:
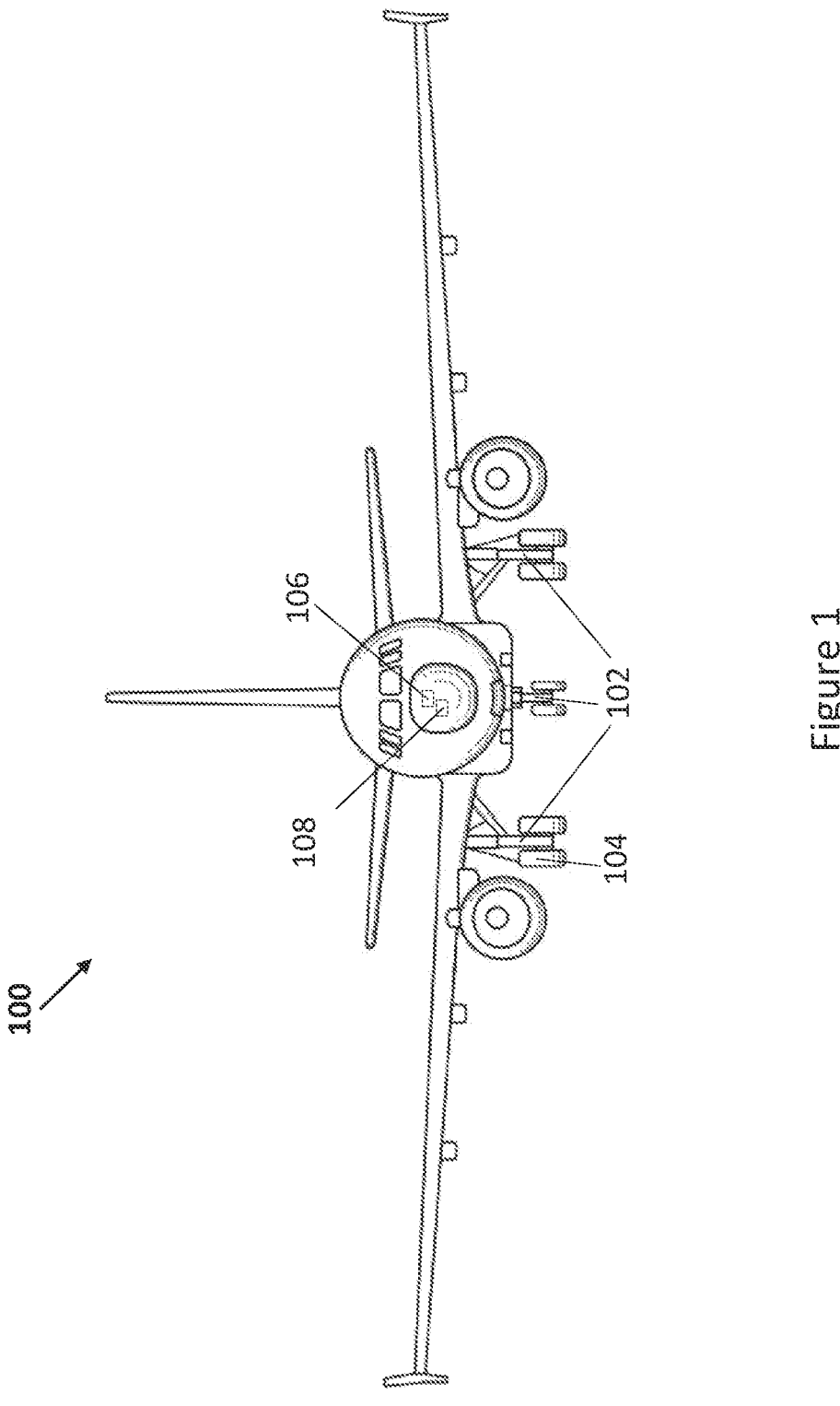
FIG. 1 is a schematic view of an aircraft on which examples may be deployed.

FIG. 1 is a simplified schematic view of an aircraft 100. The aircraft 100 comprises a plurality of landing gear assemblies 102. The landing gear assemblies may include main and nose landing gears that are extended during take-off and landing. Each landing gear 102 includes wheels such as wheel 104. The aircraft 100 comprises a computing system 106 which may, for example, comprise one or more processors and one or more computer readable storage media. The aircraft 100 may also comprise instruments 108, such as instruments or sensors for measuring characteristics or parameters related to the aircraft, and instruments or sensors for measuring environmental characteristics.

Figure 2:
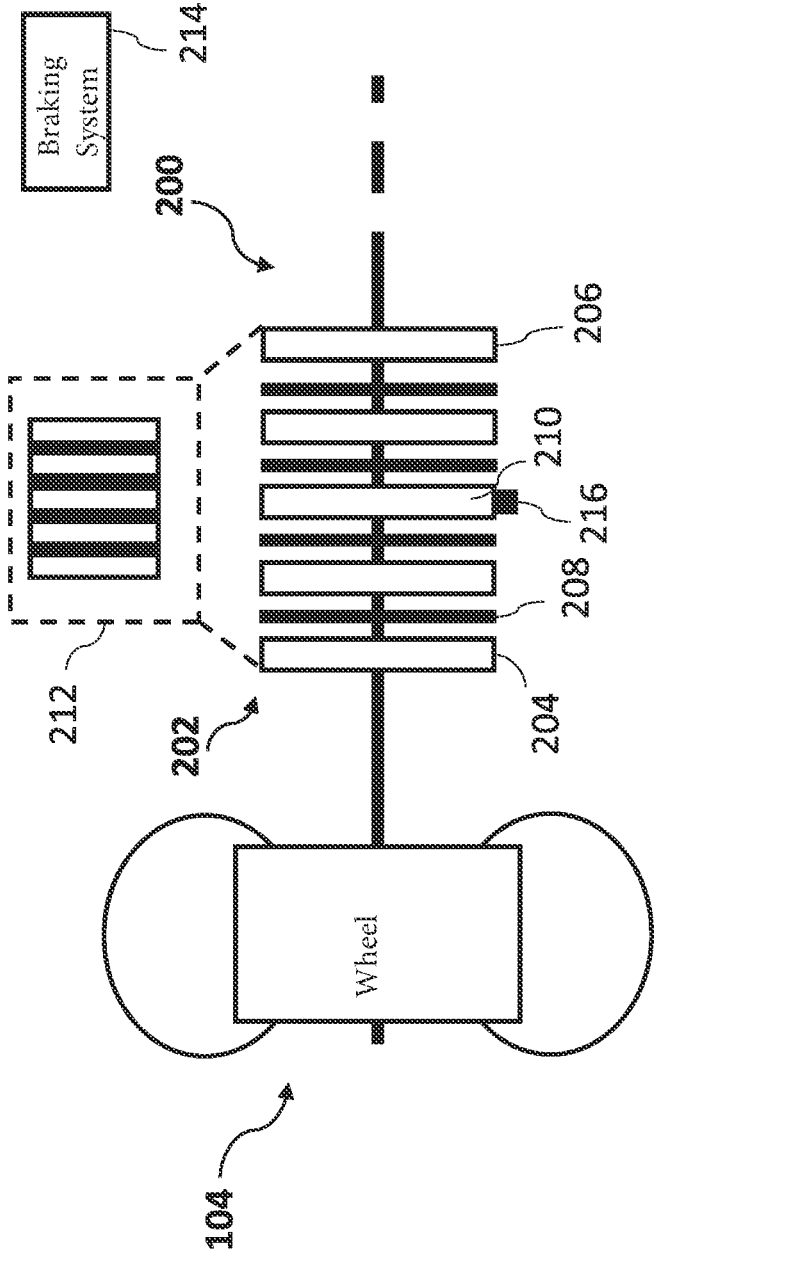
FIG. 2 is a schematic view of a brake and a wheel of an aircraft landing gear according to an example.

FIG. 2 is a simplified schematic view of a brake assembly 200 associated with the wheel 104 of the aircraft 100. The brake assembly 200 applies a braking force to inhibit the rotation of the wheel 104 when applied. Each of the wheels of the aircraft 100 may have a wheel brake such as brake assembly 200 associated with it. In this example, the brake assembly 200 comprises a plurality of brake discs 202 including a pressure plate 204, a reaction plate 206, and a number of rotors and stators such as the rotor 208 and the stator 210. In this example, the brake discs 202 include a plurality of rotors and stators, and the brake assembly 200 is therefore a multiple disc brake. In other examples, the brake assembly 200 may not be a multiple-disc brake. In some examples, the brake discs 202 may include 9 discs or 11 discs, or any other number which is suitable for a brake assembly of an aircraft. The brake discs 202 may collectively be referred to as a heat pack. The components of the brake assembly 200 (hereafter, for brevity, the brake assembly 200 is referred to simply as the brake 200) such as the brake discs 202 may be housed in a brake assembly housing (not shown). As referred to herein, the term brake assembly (or brake) is used as if to include such a brake assembly housing.

It will be understood that the type of wheel brake used in an aircraft landing gear depends on the characteristics of the aircraft in question, such as size, carrying capacity and the like. The following may be applied to any wheel brakes suitable for use as aircraft wheel brakes which are applied to reduce aircraft speed, as discussed in the following.

When the aircraft 100 travels along the ground supported by the landing gear 102, the rotors rotate with the wheel 104 (the rotors are keyed to the wheel 104), whereas the stators, the pressure plate 204 and the reaction plate 206 do not rotate with the wheel 104 (the stators, the pressure plate 204 and the reaction plate 206 are keyed to a stationary part of the brake assembly 200 or a stationary axle associated with the wheel 104). When braking is applied, the pressure plate 204 is urged towards the reaction plate 206 so that the brake discs 202 come into contact with one another (as shown in box 212 of FIG. 2) and friction acts to inhibit the rotational motion of the rotors, thus generating a braking force. When the brake 200 is applied, some of the kinetic energy of the aircraft 100 is absorbed into the brake discs 202 as heat (by the action of friction). Accordingly, the brake 200 heats up when it is applied and causes the aircraft 100 to slow down.

Any one or more of the rotors, stators, pressure plate 204 and the reaction plate 206 may be composed of Carbon-Carbon (CC) composites. A brake including brake discs composed of CC composites may be referred to as a carbon brake. For example, the brake discs 202 may be composed of a graphite matrix reinforced by carbon fibers. In the following examples, the brake discs 202 are assumed to be carbon brake discs. However, in other examples, the brake discs may comprise other materials such as steel, carbon-ceramic or another material which is suitable for use in aircraft brake discs. The following methods may be applied irrespective of the specific material of the brake discs.

The aircraft 100 may comprise a braking system 214 which controls the operation of the brake 200. The braking system 214 causes the brake 200 to be applied in response to a braking request (e.g. when a pilot of the aircraft 100 presses a brake pedal). For example, the brake 200 may be hydraulically actuated in which case the braking system 214 includes a hydraulic system operationally connected with the brake 200. In other examples, the brake 200 may be electrically actuated in which case the braking system 214 includes an electronic brake actuation system. The braking system 214 may be controlled by the computing system 106.

Figure 3:
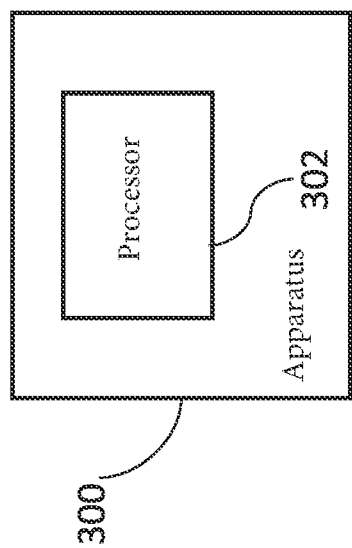
FIG. 3 is a schematic view of an apparatus according to an example.

FIG. 3 is a simplified schematic view of an apparatus 300. The apparatus 300 comprises a processor 302. The processor 302 is configured to determine a mass parameter indicative of a mass of an aircraft brake assembly, such as the brake 200, the mass parameter determined using an estimated amount of energy absorbed by the brake assembly in a given period of time and a corresponding change in temperature of the brake assembly.

As previously described, some of the kinetic energy of the aircraft 100 is absorbed into the brake 200 as heat when the brake 200 is applied to reduce the speed of the aircraft 100. Specifically, the energy is absorbed at the brake discs 202 which is where friction acts to inhibit the rotational motion of the wheel 104. Therefore, the change in temperature corresponding to the amount of energy absorbed occurs at the brake discs 202. Because energy is absorbed, the change in temperature is an increase in temperature.

The increase in temperature of the brake 200 corresponding to the amount of energy it absorbs depends on the mass of the brake 200. More specifically, because the energy is absorbed by the brake discs 202, the increase in temperature depends on the mass of the brake discs 202 (in other words, the mass of the heat pack). Hereinafter, the estimated amount of energy absorbed and the corresponding change in temperature is referred to with respect to the brake discs 202.

The given period of time relating to the estimated amount of energy absorbed may be any period of time during which the brake 200 is applied one or more times. For example, the given period of time may include a landing of the aircraft 100. A landing includes the aircraft 100 which is airborne landing onto a runway, for example. The landing includes the application of the brake 200 to slow the aircraft 100 down once the aircraft 100 has touched down. The given period of time may also include applications of the brake 200 subsequent to the landing. Braking applications subsequent to the landing are, for example, applications of the brake 200 during the time that the aircraft 100 taxis from the landing strip to an arrival gate at the airport where landing occurred. Such brake applications during a taxiing phase after landing may be referred to as taxi snubs.

The given period of time may be selected to include any part of the time from when the aircraft touches down to when the aircraft arrives at an arrival gate. It may be advantageous to select the given period of time so that it at least includes the landing. This is because when the aircraft 100 lands, the brake 200 is applied with great force to reduce the speed of the aircraft 100 and the most amount of energy is expected to be absorbed by the brake 200 at landing. In the following described examples, the given period of time is selected such that it includes all brake applications from touch down to arrival of the aircraft 100 at the arrival gate. However, in other examples, a different given period of time may be selected. Any given period of time during which at least one application of the brake 200 takes place resulting in a reduction of the speed of the aircraft 100 may be used in the following methods.

The processor 302 may be configured to determine the mass parameter by dividing the estimated amount of energy by the corresponding estimated change in temperature. An amount of energy absorbed can be related to a change in temperature according to equation (1) provided below.

$$E_{abs} = m \times c \times \Delta T \qquad (1)$$

In equation (1) above, $E_{abs}$ represents the energy absorbed, m represents the mass of the entity which absorbs the energy $E_{abs}$ (e.g. the brake discs 202), c represents the specific heat capacity of the entity which absorbs the energy $E_{abs}$ and $\Delta T$ represents the change in temperature corresponding to the energy $E_{abs}$.

It can be seen from equation (1) that dividing the energy $E_{abs}$ by the corresponding change in temperature $\Delta T$ provides the product of the mass and the specific heat capacity $m \times c$. This product is an example of the mass parameter. The mass parameter provides an indication of the mass of the entity in question because it depends on the mass of the entity in question. In the examples described herein, the entity in question are the brake discs 202 as a whole.

Figure 4:
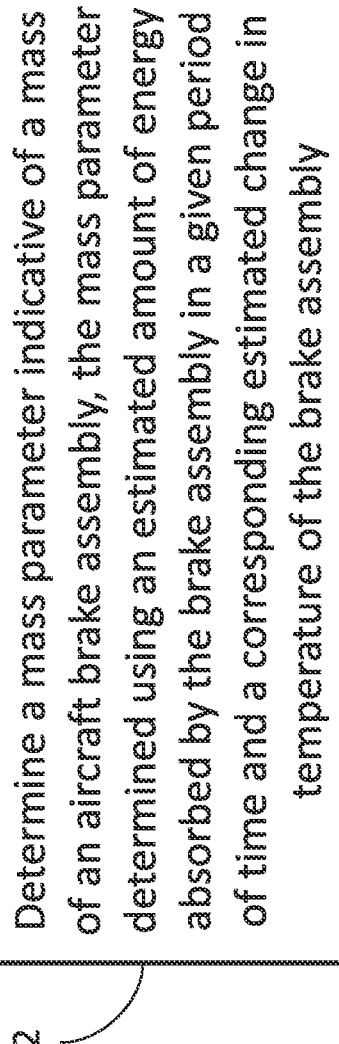
FIG. 4 is a flow diagram of a method of determining a mass parameter, according to an example.

FIG. 4 is a flow diagram of a method 400. At block 402 of the method 400, a mass parameter indicative of a mass of an aircraft brake assembly (such as the brake 200) is determined, the mass parameter determined using an estimated amount of energy absorbed by the brake assembly in a given period of time and a corresponding estimated change in temperature of the brake assembly. The method 400 may be performed by the processor 302 of the apparatus 300.

Figure 5A:
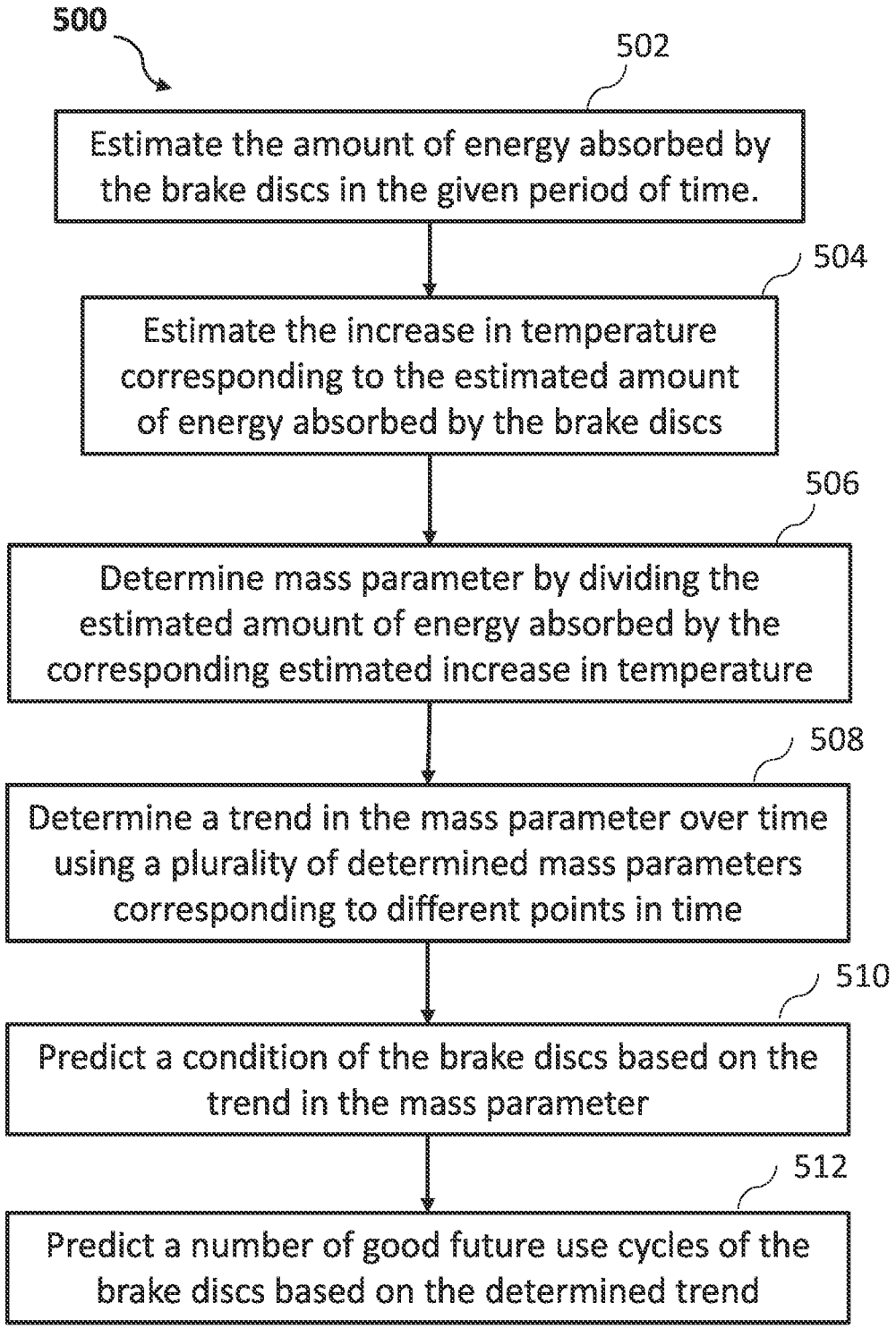
FIG. 5*a* is a flow diagram of a method of determining a mass parameter, according to an example.

FIG. 5a is a flow diagram of a method 500, which is a more specific example of the described method 400. The method 500 may be performed by the processor 302 of the apparatus 300. In other words, the processor 302 may be configured to perform one or more of the processing blocks shown in FIG. 5a.

At block 502 of the method 500, the amount of energy absorbed by the brake discs 202 in the given period of time is estimated. In this example, the given period of time covers the landing of the aircraft 100 and subsequent taxiing until the aircraft 100 is stationary at its arrival gate. The ways in which the amount of energy absorbed is estimated are described in further detail hereafter.

At block 504 of the method 500, the increase in temperature of the brake discs 202 corresponding to the amount of energy absorbed in the given period of time is estimated. The ways in which the increase in temperature may be estimated are described in further detail hereafter.

The processing according to the blocks 502 and 504 may be performed in any order. For example, the processor 302 may perform block 502 before block 504, or the processor 302 may perform block 504 before block 502, or the processor 302 may perform the processing according to blocks 502 and 504 contemporaneously, or the processor 302 may temporarily interrupt the processing according to one of blocks 502 and 504 to progress with the processing according to the other block. The order shown in FIG. 5a is not limiting.

At block 506 of the method 500, the mass parameter is determined by dividing the estimated amount of energy absorbed by the brake discs 202 by the corresponding estimated increase in temperature. As previously described, the mass parameter determined in this way is the product of the mass and the heat capacity of the brake discs 202. In other words, in this example, the mass parameter is directly equal to the energy absorbed by the brake discs 202 in the given period of time and the corresponding increase in temperature of the brake discs 202. Accordingly, although the mass parameter is not directly the mass of the brake discs 202 (e.g. in kilograms), it nevertheless provides an indication of the mass of the brake discs 202. In other words, the mass parameter is a function of the mass of the brake discs 202. In this example, the mass parameter is directly proportional to the mass of the brake discs with the heat capacity of the brake discs 202 being the constant of proportionality.

It may be advantageous to have an indication of the mass of the brake discs 202 of the aircraft 100 to enable the health of the brake assembly 200 to be predicted. Such an indication of the mass of the brake discs 202 can be determined remotely from the brake discs 202. In other words, it is not required to perform physical/visual checks of the brake discs 202 to get an indication of the mass of the brake discs 202.

FIG. 5a further illustrates additional processing blocks relating to processing which is in addition to just the determination of the mass parameter. At block 508 of the method 500, a trend in the mass parameter of the brake discs 202 over time is determined using a plurality of determined mass parameters corresponding to different points in time. For example, the processor 302 may be configured to determine a trend in the mass parameter of the brake discs 202 over time using a plurality of determined mass parameters corresponding to different points in time. For example, if mass parameters for previous points in time are available (e.g. from previous iterations of blocks 502 to 506), the trend in the mass parameter over time can be determined. The mass parameters relating to previous flights of the aircraft 100 may be used, for example. If the trend has previously been determined, the trend may be updated when a new mass parameter is determined (e.g. as described in relation to blocks 502 to 506).

The trend in the mass parameter over time indicates the variation of the mass of the brake discs 202 over time. Therefore, by determining the trend in the mass parameter, the rate at which the mass of the brake discs 202 is decreasing may be determined. The rate of decrease of the mass parameter may be taken to be the same as the rate at which the mass of the brake discs 202 is decreasing. Determining the trend in the mass parameter advantageously enables a determination of how the mass of the brake discs 202 is changing with time (for example, with each flight of the aircraft 100). The determination of how the mass is changing can advantageously be made without having to determine the actual mass (e.g. the mass in kilograms) of the brake discs 202. This means that, for example, it is not required to know the specific heat capacity of the brake discs 202 in order to get an indication of the change in the mass of the brake discs over time. Advantageously, the methods herein can be applied to various different brake discs (e.g. from different manufacturers or brakes using different material types) without the need to establish particular physical properties of the brake discs such as the specific heat capacity.

For example, to determine the trend in the mass parameter, data fitting techniques may be used. For example, an algebraic expression is used to fit the plurality of mass parameter values. The algebraic expression may be chosen based on how the mass parameter (and accordingly the mass of the brake discs 202) is expected to change over time (e.g.

with each flight of the aircraft 100). In examples where the mass parameter is expected to decrease linearly, the algebraic expression may be of the form y=m×x+c, where y represents the mass parameter values, m represents the rate of change of the mass parameter, x represents time or the number of flights as the case may be and c is a constant. In other examples, polynomials of different orders, exponential functions, trigonometric function, or combinations thereof may be used. Other suitable functions may be used which are suitable to describe the decrease in the mass parameter. In some examples, a particular function or function combination may be used to fit the mass parameter values for a particular time period (e.g. particular flights) and a different function or function combination may be used to fit the mass parameter values for a different particular time period (e.g. different particular flights).

Various techniques for data fitting may be used to determine the trend in the mass parameter. Examples of data fitting techniques include regression analysis, least squares method, among others, as will be appreciated by those skilled in the art.

The mass of the brake discs 202 may decrease with use due to brake wear. During braking applications, the brake discs 202 come into contact with one another and there is friction between them, as previously discussed. Due to this friction, the brake discs 202 lose material with use. The loss of material results in a loss of the mass of the brake discs 202.

The manner in which material is lost from the brake discs 202 due to wear may vary based on factors such as the properties of the brake discs and the aircraft usage, for example. Therefore, the rate of decrease in the mass of the brake discs 202 may vary based on factors such as the properties of the brake discs and the aircraft usage, for example. As an example, one or more of the brake discs may not have uniform density. In such examples, when the face of one or more of the brake discs 202 where friction acts is in a region of lower relative density, the decrease in mass may occur at a faster rate. Accordingly, the rate of decrease in the mass of the brake discs 202 may vary through the life of the brake discs. Also, for example, the aircraft 100 may periodically land at a given airport where a relatively large number of brake applications take place when the aircraft lands and subsequently taxis to the arrival gate. The decrease in the mass of the brake discs 202 corresponding to such a landing and subsequent taxi may be greater than other landings at other airports. In some examples, the decrease in the mass of the brake discs may basically be linear (in other words the rate of decrease of the mass of the brake discs 202 may basically be constant). For example, the brake discs may have relatively uniform density, other properties of the brake discs 202 may enable the brake discs to wear in a linear manner, the aircraft usage may not vary greatly from flight to flight, and the like. In the following description, for simplicity of explanation, it is assumed that the decrease in the mass of the brake discs 202 over time is substantially linear. However, the described methods may be applied in examples where the rate of decrease of the mass of the brake discs 202 varies.

Friction acts on the surfaces of the brake discs 202 which are in contact with one another. As shown in FIG. 2, the faces of the brake discs contact each other. When the brake is applied fully and the all the brake discs are in contact, the brake discs 202 have a combined length L, as indicated in FIG. 2. Material is lost from the surfaces of the brake discs

202 at which friction acts. Therefore, the mass lost due to wear corresponds to a reduction in the length L of the brake discs 202.

Another mechanism by which the brake discs 202 may lose mass is oxidation. The brake discs 202 may oxidise via catalytic oxidation or thermal oxidation. Catalytic oxidation occurs when the oxidation reaction is aided by the action of a catalyst. For example, alkali metals are known catalysts for oxidation of CC composites. Catalytic oxidation may be relevant in areas where the air has relatively high salinity. Catalytic oxidation may also be relevant where the wheel brakes are exposed to chemical compounds which act as catalysts for oxidation of the brake discs. An example of such chemical compounds are runway de-icers comprising alkali salts, among others. Thermal oxidation of the brake discs 202 may occur if the brake discs 202 reach high temperatures. During use, the brake 200, specifically the brake discs 202, may reach high temperatures. During a thermal oxidation reaction, oxygen reacts with the carbon of the brake discs 202, causing carbon atoms to be removed from the brake discs 202 as carbon dioxide and/or carbon monoxide is produced, leading to a loss of mass. The change in the mass of the brake discs 202 over time may vary differently (e.g. in a significantly non-linear fashion) if, for example, significant thermal oxidation occurs during a particular landing. In some examples, a sharp decrease in the mass parameter may be observed due to oxidation.

At block 510, a condition of the brake assembly 200 is predicted based on the trend in the mass parameter. Specifically, the condition of the brake discs 202 is predicted. For example, the amount of wear the brake discs 202 have undergone is predicted. For example, if the trend in the mass parameter shows a 5% reduction in the value of the mass parameter from the time the brake assembly 200 was new up to the current time, it may be predicted that the brake discs 202 have lost about 5% of their mass (or a slightly adjusted value based on offsets which account for uncertainty in certain measurements and the like).

Predicting the condition of the brake discs 202 may also include predicting whether or not the brake discs 202 have undergone thermal oxidation, for example. In some examples, the brake discs 202 may comprise a lining which is intended to inhibit oxidation of the brake discs 202. If there is damage to such a lining, the brake discs may exhibit oxidation. In some examples, the brake discs 202 may exhibit oxidation due to the brake discs 202 reaching particularly high temperatures (e.g. due to heavy braking during landing) irrespective of any lining. If after a given flight, the trend in the mass parameter shows a sudden decrease in the mass parameter and/or a change in the rate of change of the mass parameter, it may be predicted that the brake discs 202 have undergone oxidation or the wear of the brake discs 202 has accelerated (which may, for example, be due to oxidation).

In order to predict the condition of the brake discs 202, the indication of the mass of the brake discs 202 enabled by the determination of the mass parameter may be supplemented by measurements from a brake wear sensor, for example. The aircraft 100 may include a wear pin associated with brake assembly 200. Typically, a wear pin provides an indication of the reduction in length L of a brake and therefore an indication of the brake wear. The wear pin may be visually checked between cycles by ground crew, for example. In some examples, there may be other ways to measure the change in length L of the brake assembly 200.

For example, a length sensor may be provided for the brake assembly 200, and/or electrically actuated brakes may be used.

Using the indication for a brake wear sensor associated with the brake 200, the length L of the brake discs can be estimated. The reduction in length may be compared to the reduction in the mass parameter to assess whether the mass lost is due to wear only (e.g. from the surface of the brake discs 202 due to friction). For example, if the length L is roughly 5% less than when the brake discs were new and the mass parameter is roughly 5% reduced, it may be predicted that the mass lost is mostly due to wear.

On the other hand, if the reduction in the length and the mass parameter is not comparable, this may indicate a change in density of the brake discs 202. The density of the brake discs 202 may decrease, for example, due to thermal oxidation. However, thermal oxidation may not necessarily change the volume of the brake discs 202. This is because thermal oxidation does not necessarily act uniformly on a particular surface of a brake disc and may take place up to a certain depth inside the brake disc. If it is predicted that the density of the brake discs 202 has changed, this may help in the prediction that the brake discs 202 have oxidised.

Predicting the condition of the brake discs 202 enables an assessment of the aircraft operations that cause significant degradation of the brake discs 202. For example, as described, the condition of the brake 200 is predicted based on the trend in the mass parameter. The trend is with respect to time or with respect to the flights of the aircraft 100. The condition of the brake discs 202 can therefore be judged at various different times. Also, for example, operational data of the flights of the aircraft 100 may be available. By analysing the operational data in combination with the condition of the brake discs 202 with respect to time, an assessment may be made as to which operational circumstances cause more degradation of the brake discs 202 than others. For example, the trend may show greater reduction in the mass parameter when using certain braking modes, landing at a specific runway at a specific airport, and the like. This greater reduction may indicate greater wear for those operational circumstances.

For example, it may be the case that the rate of decrease of the mass parameter is greater than desired and can be reduced by operating the aircraft 100 in a manner so that the brake discs 202 experience less wear. As another example, after a particular landing, the mass parameter may decrease sharply, indicating damage to the lining for inhibiting oxidation and/or brake temperatures high enough for significant thermal oxidation. Accordingly, it may be assessed that the operational parameters relating to that particular flight are linked to damage to the lining/thermal oxidation.

Such an assessment may enable the manner in which the aircraft 100 is operated to be optimised so as to preserve the brake discs 202. For example, different braking modes may be used, the itinerary of the aircraft in question may be modified, and the like.

Figure 6:
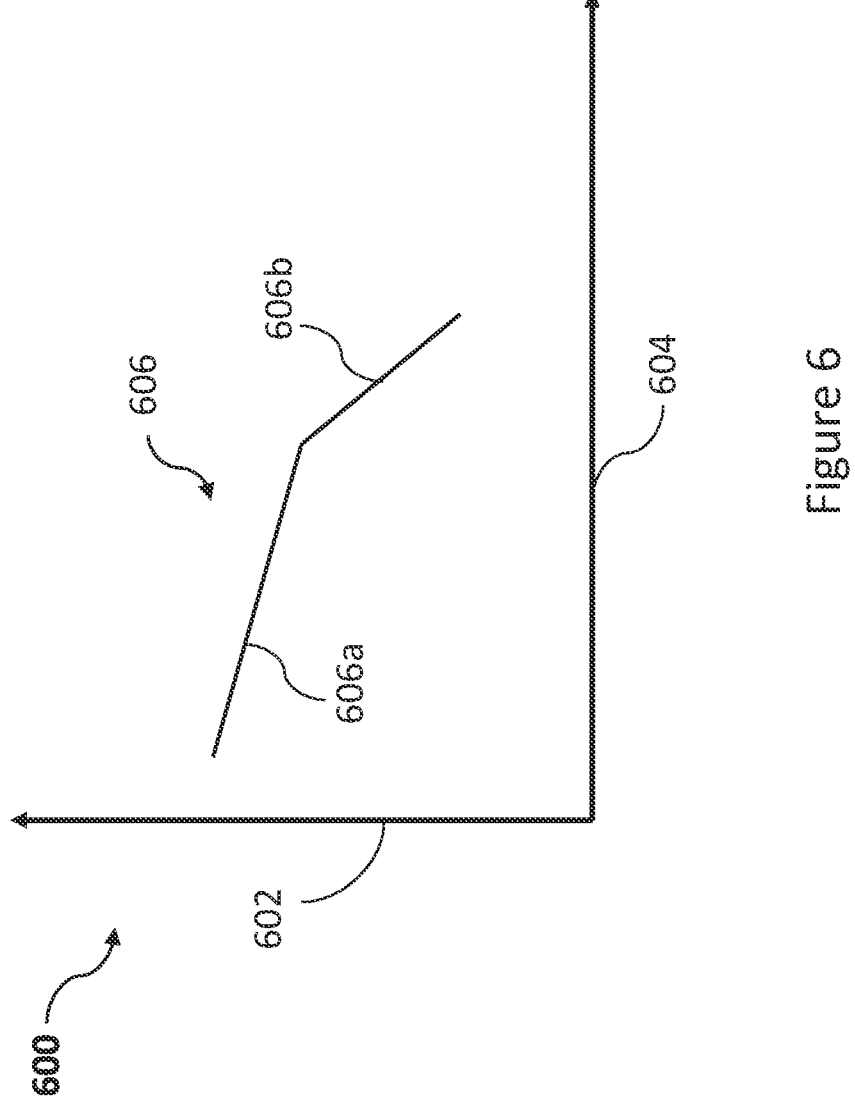
FIG. 6 is a schematic diagram of a graph indicating a trend in a mass parameter with respect to time, according to an example.

FIG. 6 is a sketch of a graph 600 indicating an example trend in the mass parameter with respect to time. The vertical axis represent values of the mass parameter. The horizontal axis 604 represents time. There is shown a curve 606 which represents different values of the mass parameter across time (e.g. mass parameter values determined for different flights). In this example, there is a first part 606a of the curve 606 showing a linear decrease in the value of the mass parameter. In this example, the linear decrease indicates wear of the brake discs 202 with use. There is a second part 606b of the curve 606. The second part 606b also shows an increased rate of change of the mass parameter. Taking the trend shown by graph 600 as an example, at a time corresponding to the first part 606a, the amount of wear of the brake discs 202 may be predicted and it may be predicted that the brake discs 202 seem to be undergoing a normal amount of wear with use (depending on the rate of change and taking into account factors such as the locations where the aircraft 100 has been making landings, runway lengths, typical mass of the aircraft and the like).

On the other hand, at a time corresponding to the second part 606b, it may be predicted that the brake discs 202 are undergoing e.g. thermal oxidation. For example, it may be predicted that at a time corresponding to the change from the first part 606a and the second part 606b, the lining of the brake discs 202 intended to inhibit oxidation became damaged.

FIG. 6 and the corresponding description is for illustrating the concept of determining the condition of the brake discs 202 using the trend in the mass parameter. The described examples in relation to predicting a condition of the brake discs are described for the purpose of explanation.

Using the trend in the mass parameter, the need for brake replacement or service may be forecast. Referring again to FIG. 5a, at block 512, a number of good future use cycles of the brake discs 202 is predicted based on the determined trend. For example, the processor 302 may be configured to predict a number of good future use cycles of the brake discs 202 based on the determined trend. The number of good future use cycles is the number of use cycles of the brake assembly 200 before it is desired that the brake assembly 200 be serviced or replaced. A use cycle may be taken to be a complete flight of the aircraft 100. For example, a use cycle may cover the time from when the aircraft 100 leaves a departure gate for a flight, up to the time when the aircraft 100 arrives at an arrival gate after landing after that flight.

For example, based on the rate of decrease of the mass parameter, a prediction may be made about how many more flights (use cycles) it would take until the brake discs 202 have lost enough mass to warrant service or replacement. For example, the trend in the mass parameter may be extrapolated for future flights. In some examples, the criterion used may be that the brake assembly 200 is to be serviced or replaced if the mass lost is 4% to 6.5% (the precise value of the threshold may depend on various factors such as the properties of the brake assembly in questions, typical mass of the aircraft in question and the like).

Also, for example, the number of good future use cycles may be predicted based on indications about oxidation seen in the trend in the mass parameter. For example, if there is an indication that there is oxidation (e.g. the transition from the first part 606a to the second part 606b in the example of FIG. 6), it may be predicted that the current brake should only be used for a small number of additional flights (e.g. one or two) before the brake assembly is serviced or replaced.

Determining the number of good future use cycles enables scheduling of brake replacement or service in advance. This avoids operational delays due to unscheduled service or replacement of the brake 200 when the brake condition is determined to be degraded enough to warrant service or replacement, e.g. during pre-flight checks or damage being identified through other means during a flight. For example, during a flight, flight crew may be provided an indication (e.g. through the computing system 106) in response to a failure that there is a problem with a brake and maintenance action is required.

FIG. 5*b* is a flow diagram illustrating a first example method 502*a* for the processing performed at block 502 shown in FIG. 5*a*. In this first example, the amount of energy absorbed by the brake discs 202 is estimated based on wheel speed data for the given period of time, brake pressure application data for the given period of time and gain data relating to a correspondence between applied brake pressure and torque reacted by the brake 200.

At block 514 of the first example method 502*a*, wheel speed data for a given brake application is input. For example, the processor 302 receives the wheel speed data for the given brake application. The given brake application is a single application of the brake 200. A single application of the brake 200, as referred to herein, covers the time from when the pressure plate 204 is urged towards the reaction plate 206 until the time that the pressure plate 204 subsequently returns to the rest position (e.g. where no brake pressure is being applied). A single application of the brake 200 would result in a reduction of the wheel speed. The previously described given period of time (e.g. for which the absorbed energy is estimated at block 502) may contain a plurality of brake applications. As previously described, in the present examples, the given period of time is selected such that it includes all brake applications from touch down to arrival of the aircraft 100 at the arrival gate.

The aircraft 100 may comprise one or more wheel speed sensors as part of the instruments 108 mentioned previously. For example, the aircraft 100 may comprise a wheel speed sensor for each of the wheels. The wheel speed sensor may comprise any suitable wheel speed sensing device or system. In some examples, the wheel speed sensor comprises or is comprised in a speed measurement system of the aircraft 100. In this example, the processor 302 receives the wheel speed data from such a wheel speed sensor associated with the wheel 104. The wheel speed data indicates the wheel speed of the wheel 104 as a function of time for the given brake application.

At block 516 of the first example method 502*a*, brake pressure application data for the given brake application is input. For example, the processor 302 receives the brake pressure application data for the given brake application. The aircraft 100 may comprise one or more brake pressure sensors as part of the instruments 108. For example, the aircraft 100 may comprise a pressure sensor for each brake assembly. The brake pressure sensor may comprise any suitable brake pressure sensing device or system. In the case of hydraulically actuated brakes, the brake pressure sensor may measure the pressure being applied to urge the pressure plate 204 towards the reaction plate 206 by the hydraulic braking system. In the case of an electrically actuated braking system, the brake pressure sensor may measure the pressure applied by electric motors or the like to urge the pressure plate 204 towards the reaction plate 206. The brake pressure application data indicates the applied brake pressure as a function of time for the given brake application.

At block 518 of the first example method 502*a*, gain data relating to a correspondence between applied brake pressure and torque reacted by the brake discs is input. For example, the processor 302 receives the gain data. For example, the processor 302 is in data communication with a computer readable data storage medium where the gain data is stored. The gain data may be determined and stored beforehand (e.g. gain data may be determined experimentally). The gain data indicates how the brake pressure translates to the torque reacted by the brake discs 202. For example, a gain value indicated by the gain data may be multiplied by the brake pressure to obtain an estimate of the torque reacted by the brake discs.

At block 520 of the first example method 502*a*, the energy absorbed by the brake discs 202 during the given brake application is estimated. The product of the wheel speed as a function of time for the given brake application, the brake pressure application data as a function of time for the given brake application and the gain is integrated over time. The integral is performed over the time that the given brake application lasted. For example, the time that the given brake application lasted may be taken to be the time at which brake pressure was first applied (as indicated by the brake pressure application data) up to the time at which brake pressure was released.

At block 522 of the first example method 502*a*, it is determined whether or not there are further brake applications in the given period of time. If there are further brake applications in the given period of time, the first example method 502*a* proceeds to block 524, and blocks 514 to 520 are repeated for a further given brake application in the given period of time.

The first example method 502*a* is performed in order to estimate the amount of energy absorbed by the brake discs 202 for all the brake applications within the given period of time. For example, at the first iteration of blocks 514 to 520, the processing according to blocks 514 to 520 may be performed for the first brake application which occurred in the given period of time. Each subsequent iteration may be performed for a subsequent brake application until the energy absorbed by the brake discs 202 for all the brake application in the given period of time has been estimated.

If there are no further brake applications in the given period of time, the first example method 502*a* proceeds from block 522 to block 526. At block 526, the energy absorbed by the brake discs 202 for each brake application in the given period of time (in other word the estimated absorbed energy for each brake application from the iterations of blocks 514 to 520) are summed. The resulting total is the estimated amount energy absorbed by the brake discs in the given period of time.

In some examples, the first example method 502*a* may be performed in a live manner during the given period of time. For example, the first example method 502*a* may be performed live during the landing. In this case, the energy absorbed during each new brake application is estimated once the brake application in question has occurred. The first example method 502*a* is continued until the end of the given period of time, and the estimated energy values are summed to estimate the amount of energy absorbed by the brake discs 202 during the given period of time. In such examples, block 522 may be omitted and blocks 514 to 520 may simply be repeated until all the brake applications are accounted for. Once all the brake applications have been accounted for, the amounts of energy absorbed for each brake application are summed.

In some examples, the first example method 502*a* may be performed periodically during the landing. In such examples, at block 526, the sum determined at a previous iteration of the first example method 502*a* for the given period of time can be added to the sum of the energy absorbed in the brake application since the last iteration. In this manner, there may be a running total of the amount of energy absorbed by the brake discs 202.

The order of the processing blocks shown in FIG. 5*b* is an illustrative example. For example, block 514, 516 and 518 may be performed in any order prior to block 520 being performed. The processor 302 may perform the processing according to blocks 514, 516 and 518 contemporaneously, or the processor 302 may temporarily interrupt the processing according to one of blocks 514, 516 and 518 to progress with the processing according to the other block.

Figure 5C:
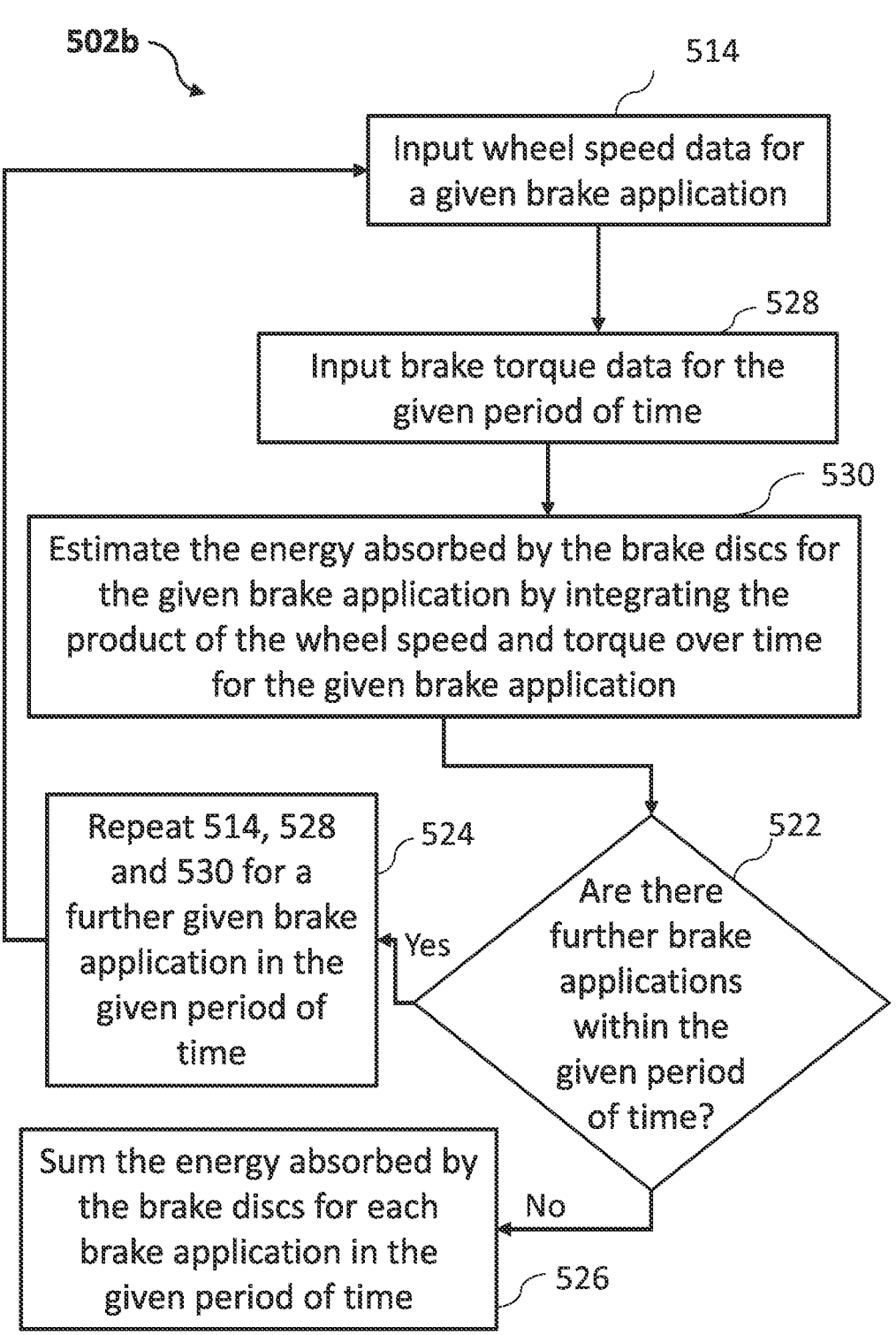
FIG. 5*c* is a flow diagram of a method of estimating the energy absorbed by a brake assembly, according to an example.

FIG. 5c is a flow diagram illustrating a second example method 502b for the processing performed at block 502 shown in FIG. 5a. In this example, the amount of energy absorbed by the brake discs 202 is estimated based on wheel speed data for the given period of time and brake torque data for the given period of time.

The second example method 502b differs from the first example method 502a in that blocks 516 to 520 of the first example method 502a are replaced by blocks 528 and 530 in second example method 502b. For brevity, description of the common features is not repeated.

At block 528 of the second example method 502b, brake torque data for the given brake application is input. For example, the processor 302 receives the brake torque data for the given brake application. In some examples, the aircraft 100 may comprise one or more brake torque sensors, as part of the instruments 108, which measure the torque reacted by associated brakes. For example, the aircraft 100 may comprise a torque sensor for each brake assembly. The torque sensor can be of any suitable design. For example, the torque sensor can comprise an optical-fibre based sensor (such as a Fibre Bragg Grating (FBG) sensor; a strain gauge, a force sensor, or any other sensor suitable for measuring torque or a quantity from which torque can be derived. On an aircraft where the brake torque is reacted via a torque pin and/or a torque rod (for example, aircraft having a classic bogie arrangement), the torque sensor can comprise an instrumented Torque Pin to sense shear force, located in the interface between a brake lug and a brake torque rod. Alternatively, an optical torque sensor could be used to measure torque in an axle to which the brake is mounted. The brake torque data indicates the torque reacted by the brake discs 202 as a function of time for the given brake application.

At block 530 of the second example method 502b, the energy absorbed by the brake discs 202 during the given brake application is estimated. The product of the wheel speed as a function of time for the given brake application and the torque reacted by the brake discs 202 as a function of time during the brake application is integrated over time to estimate the absorbed energy. The integral is performed over the time that the given brake application lasted. For example, the time that the given brake application lasted may be taken to be the time at which the brake assembly 200 first started to react torque (as indicated by the brake torque data) up to the time at which the brake assembly 200 stopped reacting torque. The time that the given brake application lasted may be determined in other ways, such as, using the amount of time the request for braking from the pilot lasted and the like.

The subsequent blocks of the second example method 502b are the same as that of the first example method 502a. It will be understood that the difference between the two example methods is the measurements which are used to estimate the energy absorbed. In some examples, the aircraft is equipped with brake pressure sensors, whereas in other examples, the aircraft is equipped with brake torque sensors. The described concepts can therefore be applied to either example.

The order of the processing blocks shown in FIG. 5c is an illustrative example. For example, block 514, 528 and 530 may be performed in any order prior to block 520 being performed. The processor 302 may perform the processing according to blocks 514, 528 and 530 contemporaneously, or the processor 302 may temporarily interrupt the processing according to one of blocks 514, 528 and 530 to progress with the processing according to the other block.

The estimation of the energy absorbed by the brake discs 202 may be supplemented by other data relating to aircraft operation. For example, data relating to landing speed and aircraft weight may be used to estimate the amount of kinetic energy which the aircraft lost on landing. Data relating to thrust reverser usage, air brake usage and the like may be taken into account to estimate how much of the kinetic energy lost in slowing the aircraft down is estimated to be absorbed by the brake 200 (e.g. the loss in kinetic energy due to reverse thrust, etc. may be subtracted from the amount of kinetic energy lost). The described estimate for the amount of energy absorbed by the brake discs 202 (using the integrals over time described previously) may be adjusted based on such estimates which use other operational data.

Referring again to FIG. 5a, as previously described, the increase in temperature corresponding to the estimated amount of energy absorbed by the brake discs 202 is estimated at block 504. For example, the increase in temperature is estimated using temperature measurements from a temperature sensor associated with the brake assembly 200.

In some examples, a temperature sensor may be provided directly on one of the brake discs 202. In the example of FIG. 2, there is a temperature sensor 216 attached to the stator 210. For example, the temperature sensor 216 may be a thermocouple, a surface acoustic wave (SAW) sensor, an eddy current sensor, a resistance thermal sensor, a strain gauge, or the like. The increase in temperature is, for example, estimated based on the measurements from the temperature sensor 216. The increase in temperature is, for example, estimated to be the difference between the peak temperature measured by the temperature sensor 216 at the end of or shortly after the end of the given period of time, and the temperature measured by the temperature sensor 216 at the beginning of the given period of time.

In some examples, there may not be a temperature sensor attached to one of the brake discs 202. Instead there may be a temperature sensor on another part of the brake assembly 200 such as the brake assembly housing. In such examples, the temperature increase at the brake discs 202 is inferred from the temperature increase as measured by the temperature sensor. For example, a temperature relationship between the temperature at the location of the temperature sensor and the temperature at the brake discs 202 may be determined experimentally, analytically or using other techniques such as two-dimensional or three-dimensional computational fluid dynamics modelling.

In examples where the temperature sensor is not attached to the brake discs 202, there may be a time delay between the energy being absorbed by the brake discs, and a corresponding change in temperature at the temperature measurement location. The estimated change in temperature corresponding to the estimated amount of energy absorbed by the brake discs 202 may is estimated based on the time delay, for example. The delay is, for example, due to the time it takes for the heat to transfer from the brake discs 202 to the location of the temperature sensor. In such examples, such a time delay is taken into account when estimating the temperature increase.

The expected time delay for the location of the temperature sensor reaching peak temperature may be part of the previously described temperature relationship between the temperature at the location of the temperature sensor and the temperature at the brake discs 202. The time delay may also depend on the environmental temperature (for example, the environmental temperature may be an input into the temperature relationship to determine the peak brake disc temperature and the time delay). Where the environmental temperature is used in any processing step, the environmental temperature may be received from an environmental temperature sensor on the aircraft 100 which is part of the instruments 108, for example.

For example, the temperature relationship may predict that the peak temperature at the temperature measurement location is to occur 15 minutes after the end of the given period of time. Accordingly, in such an example, a peak temperature value from measurements by the temperature sensor at the temperature measurement location around 15 minutes after the end of the given period of time may be used to estimate the temperature increase. A range of temperature measurements around this time may be acquired and the peak temperature determined from those measurements. Note that a 15 minutes delay is merely an explanatory example.

The estimated change in temperature of the brake discs 202 corresponding to the estimated amount of energy absorbed by the brake discs 202 may be determined based on operational information relating to a brake cooling apparatus. For example, the aircraft 100 may comprise one or more brake cooling fans configured to cool the brake assembly 200. The operation of the brake cooling fan may affect the peak temperature which is measured from the temperature sensor 216 on the brake discs 202. For example, if the brake cooling fan has been operating during the taxiing phase after landing, the peak temperature measured after the end of the given period of time may be lower. To get a relatively good estimate of the increase in temperature, an offset may be added to the estimated peak brake disc temperature to account for the brake cooling fan cooling the brake discs 202. For example, an offset may be added to the peak temperature measured by the temperature sensor 216 or the temperature sensor at a different location of the brake assembly 200.

The offset would depend on the operational information relating to the brake cooling fan (e.g. with what intensity and for how long the brake cooling fan has been operating, and the like). Various offset values for different operational states of the brake cooling fan may be determined, e.g. experimentally, and stored in the computer readable storage medium in data communication with the processor 302. The appropriate offset value may then be selected based on the relevant operational information.

The described methods may be performed by the apparatus 300. The apparatus 300 may form part of the aircraft 100. For example, the apparatus 300 may be part of the computing system 106 of the aircraft 100. In some examples, the apparatus 300 may be remote from the aircraft 100 and may receive data from the aircraft 100 (or the relevant data may be input by a user of the apparatus 300—e.g. using a mouse and keyboard, a touch interface or the like) in order to perform the described methods. For example, the apparatus 300 may be remote from the aircraft 100 and may receive data (e.g. wirelessly) from the aircraft 100 in order to perform the described methods. For example, relevant data may be transmitted live from the aircraft 100 to the apparatus 300 or data may be downloaded at a later time in a manor to enable the described methods to be performed at a later time. In some examples, parts of the described methods may be performed by processors which are remote from each other. In examples where certain parts of the described methods are performed in a live manner (e.g. during a landing), those parts may be performed by a processor on the aircraft 100.

The processor or processors which perform the described methods may do so by implementing instructions stored on a computer readable storage medium (e.g. of the computing system 106 where the processor in question is part of the computing system 106). In some examples, there may be dedicated processors to implement the described method steps provided on the aircraft 100 (e.g. separately to the computing system 106). In some examples, there is a provided a non-transitory computer readable storage medium (e.g. as part of the computing system 106 or otherwise) having stored thereon instructions which when executed by a processor, cause the processor to perform all or part of any of the methods described herein.

All or part of the instructions for performing the above described methods may be generated and/or the methods may be performed using any suitable software or combination of software. In one example, "MATLAB" may be used to generate all or part of the instructions for respective processors to carry out any of the above methods. In other examples, other software packages may be used. For example, any suitable programming language, development environment, software package, or the like may be used. Other examples of programming languages include PYTHON, C++, C, JAVASCRIPT, FORTRAN etc.

Although the invention has been described above with reference to one or more preferred examples, it will be appreciated that various changes or modifications may be made without departing from the scope of the invention as defined in the appended claims.

The invention claimed is:

1. A system comprising:
   temperature sensor configured to sense a temperature of an aircraft brake assembly on an aircraft and output temperature data indicative of the sensed temperature, wherein the temperature sensor is mounted to a brake disc in the aircraft brake assembly and the aircraft includes a plurality of braking modes; and
   a processor configured to:
      receive the temperature data,
      use the temperate data to estimate a change in temperature of the aircraft brake assembly,
      repeatedly determine a mass parameter indicative of a mass of the aircraft brake assembly, the mass parameter is determined using an estimated amount of energy absorbed by the brake assembly in a given period of time and the estimated change in temperature of the brake assembly,
      store each of the mass parameters and a point in time corresponding to the mass parameter,
      determine a trend in the mass parameters of the brake assembly over the period, wherein the determination of the trend is based on the stored mass parameters and points in time, and
      select a braking mode from the plurality of braking modes based on the trend in the mass parameters.

2. The system according to claim 1, wherein the processor is configured to:
   repeatedly determine the mass parameter by dividing the estimated amount of energy by the estimated change in temperature.

3. The system according to claim 1, wherein the processor is configured to predict a number of good future use cycles of the brake assembly based on the determined trend.

4. The system according to claim 1, wherein the processor is configured to predict a condition of the brake assembly based on the determined trend.

5. The system according to claim 1, wherein the processor is configured to estimate the amount of energy absorbed by the brake assembly based on wheel speed data for the given period of time, brake pressure application data for the given period of time and gain data relating to a correspondence between applied brake pressure and torque reacted by the brake assembly.

6. The system according to claim 1, wherein the processor is configured to estimate the amount of energy absorbed by the brake assembly based on wheel speed data for the given period of time and brake torque data for the given period of time.

7. The system according to claim 1, wherein the estimated change in temperature is further estimated based on a time delay between energy being absorbed by the brake assembly and a corresponding change in temperature at a temperature measurement location.

8. The system according to claim 1, wherein the estimated change in temperature is further estimated based on operational information relating to a brake cooling apparatus.

9. An aircraft comprising the system according to claim 1.

10. The system of claim 1, wherein the estimated change in temperature is an estimate of a temperature change in the aircraft brake assembly occurring during the given period.

11. The system of claim 1, wherein the processor is further configured to apply the selected braking mode to brake the aircraft.

12. A method comprising:

generating temperature data by sensing a temperature of an aircraft brake assembly on an aircraft using a temperature sensor mounted to a disc of the aircraft brake assembly;

determining an estimated change in temperature of the aircraft brake assembly based on the temperature data; and repeatedly determining a mass parameter indicative of a mass of the aircraft brake assembly, the mass parameter is determined using an estimated amount of energy absorbed by the brake assembly in a given period of time and the estimated change in temperature of the brake assembly;

storing each of the mass parameters and a point in time corresponding to the determination of each of the mass parameters;

determine a trend in the mass parameters is based on the stored mass parameters and points in time, and selecting a braking mode from a plurality of braking modes of the aircraft based on the trend in the mass parameters.

13. The method according to claim 12, comprising determining the mass parameter by dividing the estimated amount of energy by the estimated change in temperature.

14. The method according to claim 12, comprising determining a condition of the brake assembly based on the determined trend.

15. The method according to claim 12, comprising predicting a number of good future use cycles of the brake assembly based on the determined trend.

16. The method according to claim 12, comprising estimating the amount of energy absorbed by the brake assembly based on wheel speed data for the given period of time, brake pressure application data for the given period of time and gain data relating to a correspondence between applied brake pressure and torque reacted by the brake assembly.

17. The method according to claim 12, comprising estimating the amount of energy absorbed by the brake assembly based on wheel speed data for the given period of time and brake torque data for the given period of time.

18. The method according to claim 12, comprising:

further estimating the estimated change in temperature based on a time delay between energy being absorbed by the brake assembly and a corresponding change in temperature at a temperature measurement location; and/or further estimating the estimated change in temperature based on operational information relating to a brake cooling apparatus.

19. The method of claim 12, wherein the determining the estimated change in temperature includes estimating a temperature change in the aircraft brake assembly occurring during the given period.

20. The method of claim 12, wherein the processor is further configured to apply the selected braking mode to brake the aircraft.

\* \* \* \* \*